US008533793B2

(12) United States Patent
Hanna, Jr.

(10) Patent No.: US 8,533,793 B2
(45) Date of Patent: Sep. 10, 2013

(54) LOCATION-AWARE SECURITY AND ACCESS SYSTEM

(75) Inventor: David A. Hanna, Jr., Bel Air, MD (US)

(73) Assignee: Digital Authentication Technologies, Inc., Boca Raton, FL (US)

( * ) Notice: Subject to any disclaimer, the term of this patent is extended or adjusted under 35 U.S.C. 154(b) by 0 days.

(21) Appl. No.: 13/035,967

(22) Filed: Feb. 26, 2011

(65) Prior Publication Data

US 2012/0017264 A1  Jan. 19, 2012

Related U.S. Application Data

(60) Provisional application No. 61/308,551, filed on Feb. 26, 2010.

(51) Int. Cl.
*G06F 21/00* (2013.01)

(52) U.S. Cl.
USPC ........ 726/5; 726/4; 726/6; 713/156; 713/168; 380/258; 709/224; 455/404.2

(58) Field of Classification Search
USPC .................. 726/3, 5; 380/255, 258
See application file for complete search history.

(56) References Cited

U.S. PATENT DOCUMENTS

| | | | | |
|---|---|---|---|---|
| 5,659,617 A | * | 8/1997 | Fischer | 380/258 |
| 6,064,706 A | * | 5/2000 | Driskill et al. | 375/372 |
| 7,551,739 B2 | * | 6/2009 | Dube et al. | 380/258 |
| 8,220,046 B2 | * | 7/2012 | Hamilton et al. | 726/19 |
| 2001/0034223 A1 | * | 10/2001 | Rieser et al. | 455/404 |
| 2002/0199103 A1 | * | 12/2002 | Dube | 713/168 |
| 2003/0083977 A1 | * | 5/2003 | Syed | 705/37 |
| 2005/0201560 A1 | * | 9/2005 | Dube et al. | 380/255 |
| 2009/0063675 A1 | * | 3/2009 | Faris et al. | 709/224 |
| 2009/0100530 A1 | * | 4/2009 | Chen | 726/29 |

* cited by examiner

*Primary Examiner* — Morshed Mehedi
(74) *Attorney, Agent, or Firm* — Patent Venture Group; Joe A. Brock, II

(57) ABSTRACT

An invention is afforded for providing security for a protected network resource. The system includes a network access apparatus in communication with a receiver that receives signals from a remote source. The network access apparatus is capable of collecting current microprint data for the receiver, which is a plurality of values based on data values received at the receiver over a predefined period of time, for example, forty-five seconds. The system also includes an authentication computer in communication with the network access apparatus. The authentication computer has access to an LSDF for the receiver, which is a plurality of values based on data values received at the receiver over a predefined period of time, for example, a twenty-four hour period of time. In operation the network access apparatus provides current microprint data for the receiver to the authentication computer, and the authentication computer compares the current microprint data to the LSDF for the receiver to authenticate an access request.

12 Claims, 5 Drawing Sheets

LOCATION-AWARE SECURITY AND ACCESS SYSTEM

CROSS REFERENCE TO RELATED APPLICATIONS

This application claims the benefit of U.S. Provisional Patent Application having Ser. No. 61/308,551, filed on Feb. 26, 2010, and entitled "A Rebroadcasting Location-aware Security and Access System," which is hereby incorporated by reference. This application is related to U.S. Pat. No. 7,231,044, filed Sep. 7, 2001, and entitled "Method and Apparatus for Real-Time Digital Certification of Electronic Files and Transactions Using Entropy Factors" and related to U.S. Pat. No. 7,551,739, filed Nov. 13, 2004, and entitled "System And Method For Container Monitoring, Real Time Authentication, Anomaly Detection, And Alerts," which are hereby incorporated by reference.

BACKGROUND OF THE INVENTION

1. Field of the Invention

This invention relates generally to network security and more specifically to a system and method for authenticating the identity of a remote electronic device user (or client) seeking electronic access to, or seeking to perform an electronic transaction with, a host device.

2. Description of the Related Art

Following the teachings of R. Dube in U.S. Pat. No. 7,231,044, timing signals propagating from remote RF sources such as GPS satellites are differentially delayed due to the presence of free electron content along the line of sight between the satellite and the receiver. Sources of such delays can include fluctuations in the ionosphere's total electron content, the movement of objects such as trees along the line of sight, and the presence of structures, such as wood, concrete, sheetrock, etc. All of these add, to different degrees, delays to the total propagation time of the signals through them. In general, such delays are a function of the specific frequency, and U.S. Pat. No. 7,231,044 describes the process of using differential time delays to extract random fluctuations that can then be used as the basis for creating non-algorithmic cryptographic keys.

Intervening materials are also known to contribute to the scattering of these signals, thereby reducing the strength of the signals (compared to an ideal case where no such intervening materials were present) arriving at the receiver. By correlating the degree of attenuation to the direction of propagation of the signal (usually characterized by altitude and azimuth angles of a satellite with respect to the horizon and the northerly, southerly or equatorially neutral direction), it is possible to develop a map of the attenuation "signature" around a receiver in a given location. To the degree that this signature is stable, it can be used at a later time to verify whether or not a receiver is in fact at a previously characterized location.

Moreover, Dube in U.S. Pat. No. 7,177,426 further teaches a means to employ location characterization and random numbers measured in real time to secure files based on location. The system can employ a challenge/response process between a client and server that further raises the difficulty in defeating such a system by employing dynamic random numbers whose values change and are updated on both client and server upon successful authentication of a user.

Very large office buildings, those within a large metropolitan area that has many high rise buildings, and inner or underground locations can severely limit or even eliminate the presence of signals at those deep locations. This makes the operation of a system employing this technology difficult or impossible.

However, Dube and R. L. Morgenstern in U.S. Pat. No. 7,551,739 teaches that signals from inside an identified and/or protected space employing random numbers, such as those from R. Dube U.S. Pat. No. 7,231,044, can be used in a broadcast to detect any anomaly, such as unauthorized movement, of the monitored object when the application of technology envisioned by U.S. Pat. No. 7,231,044 is not feasible.

Whereas, U.S. Pat. No. 7,551,739 covers the broadcast of random numbers from within an identified and/or protected space (fixed or mobile) to objects nearby for purpose of anomaly detection, there is still a need to develop a solution in which external signals can be provided to inner regions of physical structures as described, without allowing the spoofing of such signals by maliciously inclined users.

SUMMARY OF THE INVENTION

Broadly speaking, embodiments of the present invention address these needs by providing a system and method for a location-aware security and access system to authenticate remote users of protected network resources by verifying the remote user's location. In one embodiment, a system is disclosed for providing security for a protected network resource. The system includes a network access apparatus in communication with a receiver that receives signals from a remote source. The network access apparatus is capable of collecting current microprint data for the receiver, which is a plurality of values based on data values received at the receiver over a predefined period of time, for example, forty-five seconds. The system also includes an authentication computer in communication with the network access apparatus. The authentication computer has access to an LSDF for the receiver, which is a plurality of values based on data values received at the receiver over a predefined period of time, for example, a twenty-four hour period of time. In operation the network access apparatus provides current microprint data for the receiver to the authentication computer, and the authentication computer compares the current microprint data to the LSDF for the receiver to authenticate an access request. In one aspect, the values for the current microprint and LSDF are jitter values. Here, each jitter value is based on a difference in arrival times of at least two timing signals from the same remote source, such as a global positioning system (GPS) satellite. To increase security, the network access apparatus can be in communication with a plurality of receivers, each receiver having an associated LSDF accessible to the authentication server. In this case, the network access apparatus can provide current microprint data for each receiver of the plurality of receivers to the authentication computer, and the authentication computer can compare the current microprint data for each receiver to the LSDF associated with each receiver to authenticate an access request. Alternatively, the network access apparatus can provide current microprint data for a random sampling of selected receivers of the plurality of receivers to the authentication computer, and the authentication computer can compare the current microprint data for each selected receiver to the LSDF associated with each selected receiver to authenticate an access request.

In a further embodiment, a method for providing security for a protected network resource is disclosed. The method includes sending a challenge request to a network access apparatus in communication with a receiver receiving signals from a remote source. The challenge request requests current microprint data for the receiver. Next, the current microprint data for the receiver is sent to an authentication server via the network access apparatus. As above, the authentication computer has access to an LSDF for the receiver. The current microprint data is compared to the LSDF for the receiver to authenticate an access request. Similar to above, the network access apparatus can be in communication with a plurality of receivers, each receiver having an associated LSDF accessible to the authentication server. Here, the current microprint data for each receiver of the plurality of receivers can be sent to the authentication computer, and the authentication computer can compare the current microprint data for each receiver to the LSDF associated with each receiver to authenticate an access request. Alternatively, current microprint data for a random sampling of selected receivers of the plurality of receivers can be sent to the authentication computer, and the authentication computer can compare the current microprint data for each selected receiver to the LSDF associated with each selected receiver to authenticate an access request.

In yet a further embodiment of the present invention, a further system is disclosed for providing security for a protected network resource. The system includes a protected network resource and a network access apparatus in communication with the protected network resource and a plurality of receivers, where each receiver receives signals from a remote source. The network access apparatus is capable of collecting current microprint data for each receiver. The system also includes an authentication computer in communication with the network access apparatus. The authentication computer has access to an LSDF associated with each receiver. In operation, the network access apparatus provides current microprint data for each receiver to the authentication computer, which compares the current microprint data to the LSDF associated with each receiver to authenticate an access request and provide access to the protected network resource. As above, in one embodiment the values are jitter values based on a difference in arrival times of at least two timing signals from the same remote source. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a location-aware security and access system to authenticate remote users of protected network resources by verifying the remote user's location. In general, embodiments of the present invention create a plurality of location specific digital fingerprints for a plurality of receivers located throughout a particular space. To create a location specific digital fingerprint for a particular receiver, timing signals at two different frequencies arriving from the same remote source are captured at a radio frequency (RF) receiver and the difference in the timing signal arrival times is extracted and compared. These differences in arrival times are converted to discrete numbers, collected, and stored over a predefined period of time (for example twenty-four hours) to create a location specific digital fingerprint for each particular receiver. When a protected network resource is later accessed, embodiments of the present invention request current data from the receivers and verify the received data against the location specific digital fingerprints for each receiver. If the received data can be verified, access is granted to the protected resource.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
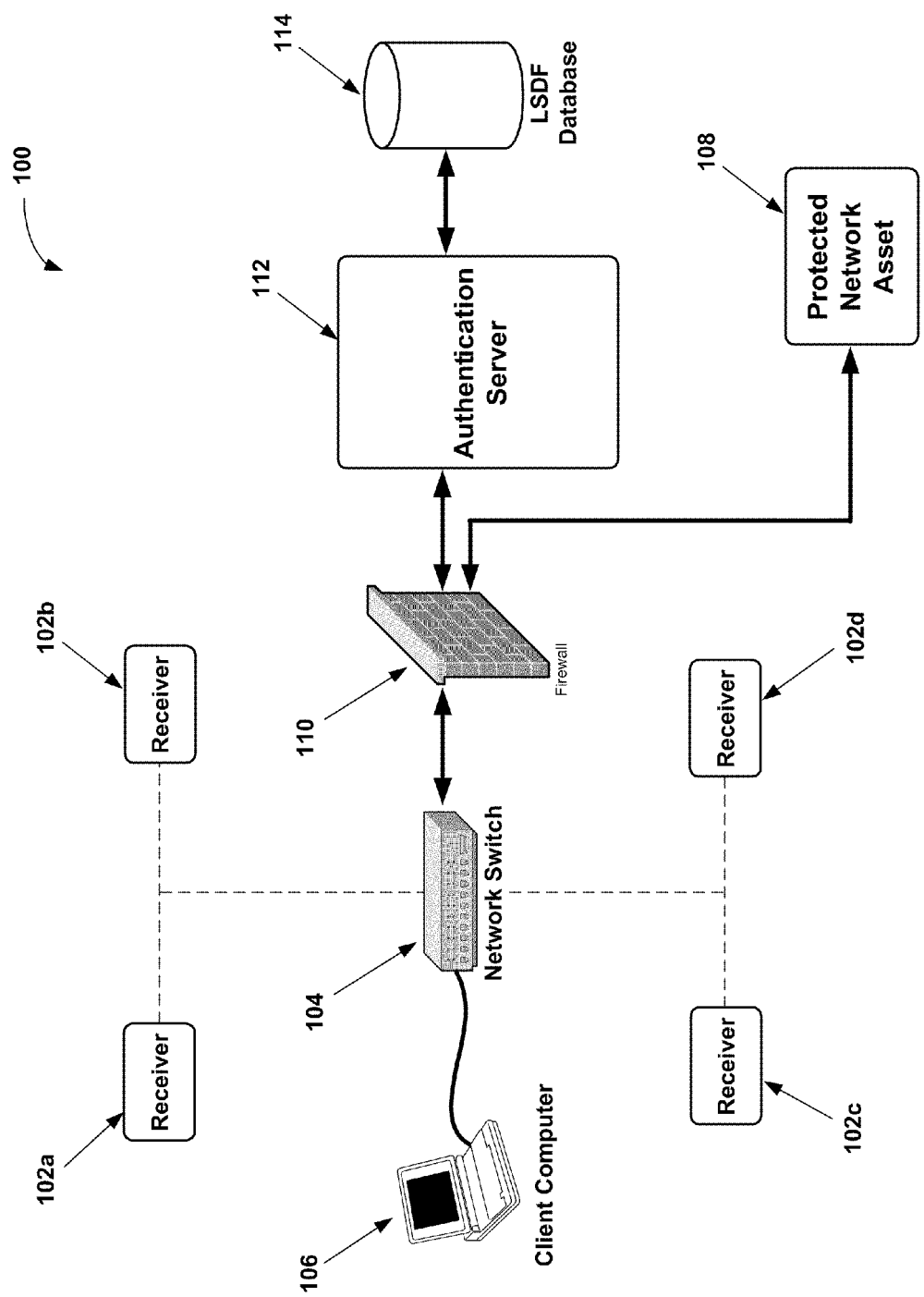
FIG. 1 is a block diagram showing an exemplary location-aware security and access system in accordance with an embodiment of the present invention.

FIG. 1 is a block diagram showing an exemplary location-aware security and access system 100 in accordance with an embodiment of the present invention. In one embodiment, the location-aware security and access system 100 provides security to protected network resources by restricting access to such resources via authenticated network equipment responsible for providing network access client computers, such as a network switch. For example, the exemplary location-aware security and access system 100 of FIG. 1 includes a network switch 104 in communication with a plurality of receivers 102a-102d. The network switch 104 is responsible for providing network access client computers 106 that are located local to the network switch 104, for example, directly connected to the network switch 104.

As illustrated in FIG. 1, the network switch 104 is in communication with a plurality of receivers 102a-102d. Each receiver 102a-102d can be located in any area within or around a particular location. For example, a receiver 102a and 102b can be located within the same room as the network switch 104 within a building, while receiver 102c can be located in another room of the same building, and receiver 102d can be located on the roof of the building. Although the network switch 104 is shown in FIG. 1 to be in communication with four receivers 102a-102d, it should be noted that the network switch 104 could be in communication with any number of receivers, although, least one receiver should be in communication with the network switch 104. In general, the receivers 102a-102d provide authentication data to the network switch 104 when required during an authentication challenge and response process, as will be described in greater detail subsequently.

The network switch 104 further is in communication with a firewall 110, which in the example if FIG. 1 is responsible for restricting access to protected network resources, such as the protected network asset 108. To facilitate authentication of network assets, the firewall 110 is in communication with an authentication server 112. Broadly speaking, when a network resource such as the network switch 104 attempts to provide access to a protected network resource, such as protected network asset 108, the authentication server 112 provides a mechanism for the firewall 110 to authenticate the network switch 104 prior to allowing access to the protected network resource via a preconstructed location specific location fingerprint database 114, which stores location specific location fingerprint (LSDF) data for each receiver 102a-102d of the location-aware security and access system 100. The LSDF data for each receiver is based on jitter values received from each radio frequency (RF) receiver 102a-102d, as described in greater detail with reference to FIG. 2.

Figure 2:
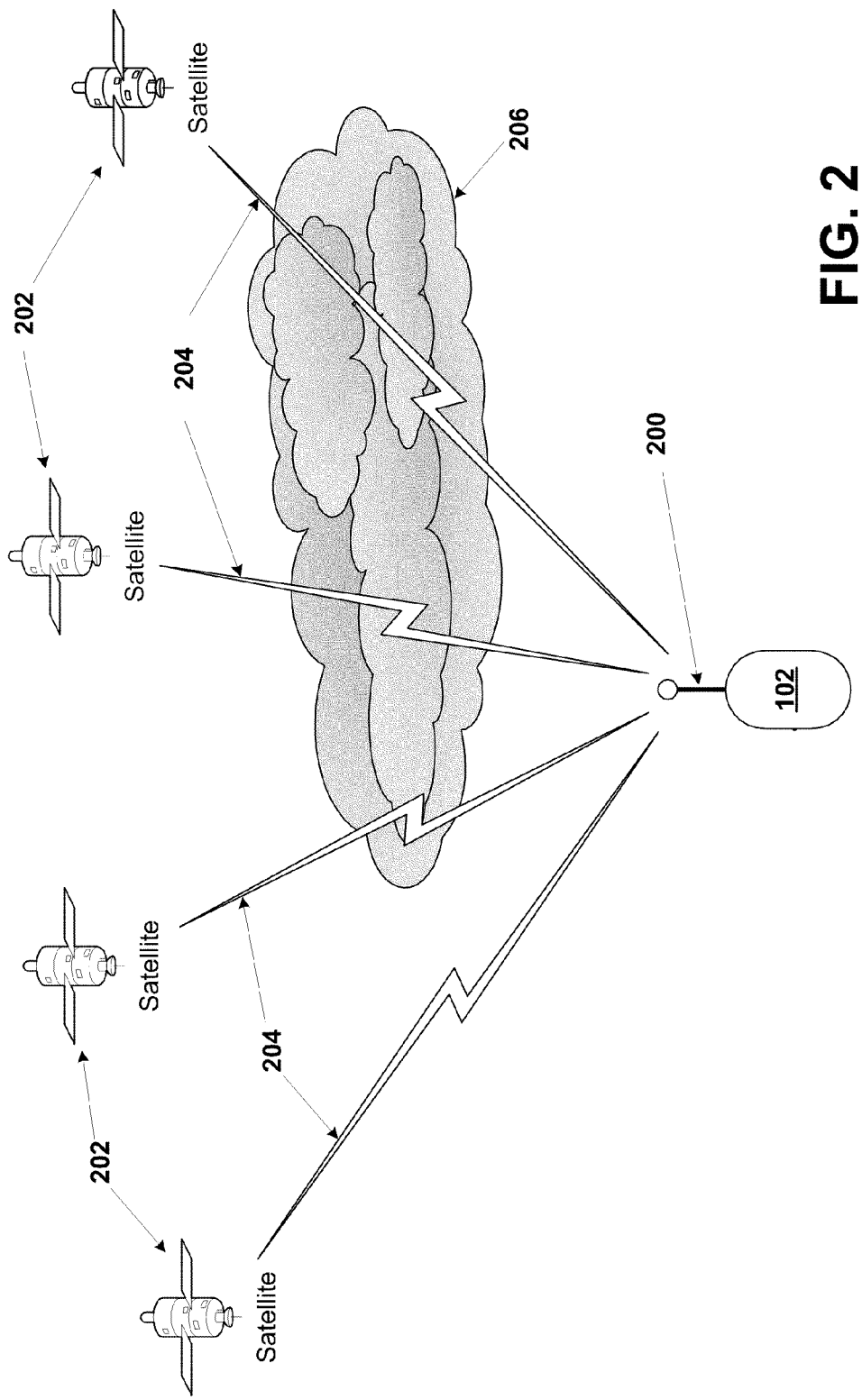
FIG. 2 is an illustration showing an RF receiver that utilizes GPS data to facilitate authentication, in accordance with an embodiment of the present invention.

FIG. 2 is an illustration showing an RF receiver 102 that utilizes GPS data to facilitate authentication, in accordance with an embodiment of the present invention. The RF receiver 102 includes an antenna 200. The RF receiver 102 makes use of remote signal sources, such as satellites 202 of the Global Positioning System (GPS), to provide timing signals 204. Although the following description is in terms of GPS technology, it should be noted that any external timing signals can be utilized by the embodiments of the present invention. As will be described in greater detail below, any external timing signals at two or more different frequencies arriving from the same remote source can be used. Further exemplary external timing signals can include cell towers, LORAN, and Global Orbiting Navigational Satellite systems (GLONASS). In addition, a multiplicity of such timing signal pairs can be utilized to generate more complex authentication tables.

The timing signals 204 include encoded time and date information that can be extracted by the RF receiver 102. By triangulation of signals from three satellites 202, the RF receiver 102 can pinpoint its current geophysical location anywhere on earth, generally to within a few meters. However, variations in the ionosphere and atmosphere 206 due to weather, barometric pressure, solar activity, and other variable and unpredictable parameters cause the purity of the timing signals 204 to fluctuate. In particular, the variations in the ionosphere and atmosphere cause unpredictable delays in the timing signals 204. To compensate for these variances, each satellite 202 of the GPS system transmits two timing signals 204 at two different frequencies (L1 and L2). In further embodiments, sideband frequencies from the same timing source can be used to allow extraction of line of sight variations in delay time by rejecting "common mode" variations.

Figure 3:
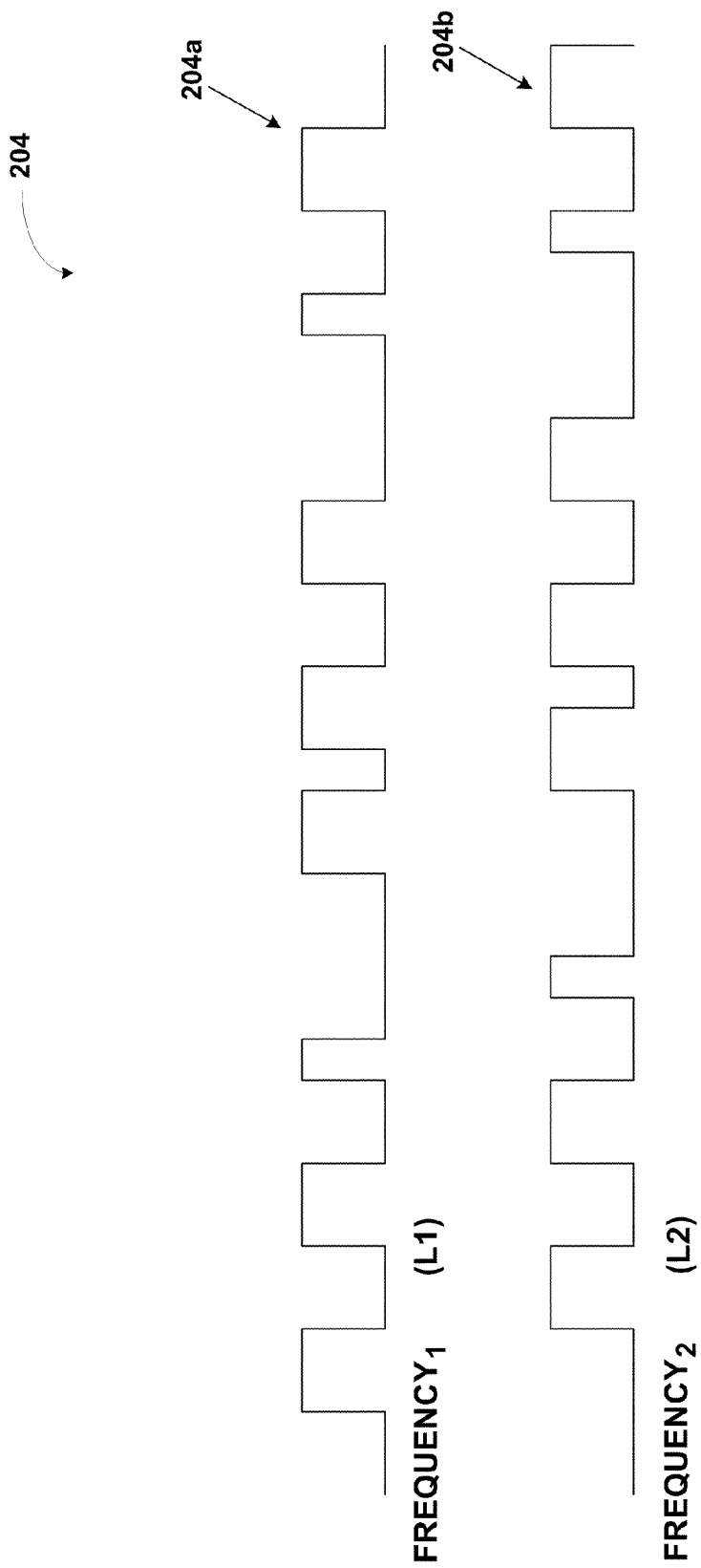
FIG. 3 is a timing diagram illustrating timing signals from a satellite of a GPS system.

FIG. 3 is a timing diagram illustrating timing signals 204 from a satellite of a GPS system. The timing signals 204 include a first timing signal 204a at a first frequency and second timing signal 204b at a second frequency. As FIG. 3 illustrates, the first and second timing signals 204a and 204b are offset from each other as a result of atmospheric variances. The delay of a radio signal is inversely proportional to the square of the carrier frequency (i.e. L2 will be delayed more than L1) and proportional to the total number of electrons along the path from the satellite 202 to the security device 200. The total number of electrons will vary according to the current solar activity, time of day (at the receiver), and longitude and latitude of the receiver. It is known to one practiced in the art that by measuring the delay between signals L1 and L2 from a particular satellite, one can calculate the effect due to the ionosphere and troposphere and correct for the variation, thereby improving positional accuracy. To compensate for the atmospheric variances, the embodiments of the present invention normalize the first and second timing signals 204a and 204b before determining geophysical location. As a result, accuracy for the location calculation is greatly improved.

Embodiments of the present invention utilize the variances in timing signals 204 as a source for an unpredictable random number, referred to hereinafter as a "jitter value." In particular, measurement of the fluctuation in timing signal delay produces a random and unpredictable number whose value depends on the moment-to-moment value of the various parameters along the path from the satellite 202 to the RF receiver 102. Therefore, this delay is specific to each satellite 202 and RF receiver 102 at a specific time and a specific location, and is extremely difficult, if not impossible, to calculate remotely. Moreover, each GPS satellite 202 is continually moving along its orbit, thereby introducing additional delay variations as different parts of the Earth's atmosphere are sequentially interposed between the satellite and the security device 200. This adds an additional element of variability and unpredictability, which extends beyond just variations in the atmospheric line-of-sight conditions. Hence, essentially the only way to obtain such a delay is by direct measurement at the specific security device 200. It should be noted that although the present description refers to timing signals L1 and L2 from GPS satellites, any timing signals that share the same original source but propagate at different frequencies, such as sidebands from a TV or FM station, can be employed to allow the extraction of similar jitter measurement. As illustrated in FIG. 2, the RF antenna 200 on the RF receiver 102 is utilized to receive jitter values and provide these values to the location-aware security and access system 100 when requested.

Referring back to FIG. 1, the LSDF database 114 generally is constructed prior to use of the location-aware security and access system 100. More particularly, prior to use, an LSDF is constructed for each receiver 102a-102d of the location-aware security and access system 100. As mentioned above, intervening materials contribute to the scattering of the timing signals 204, thereby reducing the strength of the signals (compared to an ideal case where no such intervening materials were present) arriving at each receiver 102a-102d. By correlating the degree of attenuation to the direction of propagation of the signal (usually characterized by altitude and azimuth angles of a satellite with respect to the horizon and the northerly, southerly or equatorially neutral direction), it is possible to develop a map of the attenuation "signature" around a receiver in a given location. To the degree that this signature is stable, it can be used at a later time to verify whether or not a receiver is in fact at a previously characterized location. Thus, each LSDF comprises a plurality of attenuated jitter values received and processed at each receiver 102a-102d. These jitter values are collected over a predefined period of time, for example twenty-four hours at each receiver 102a-102d to create an LSDF for each receiver 102a-102d.

Figure 4:
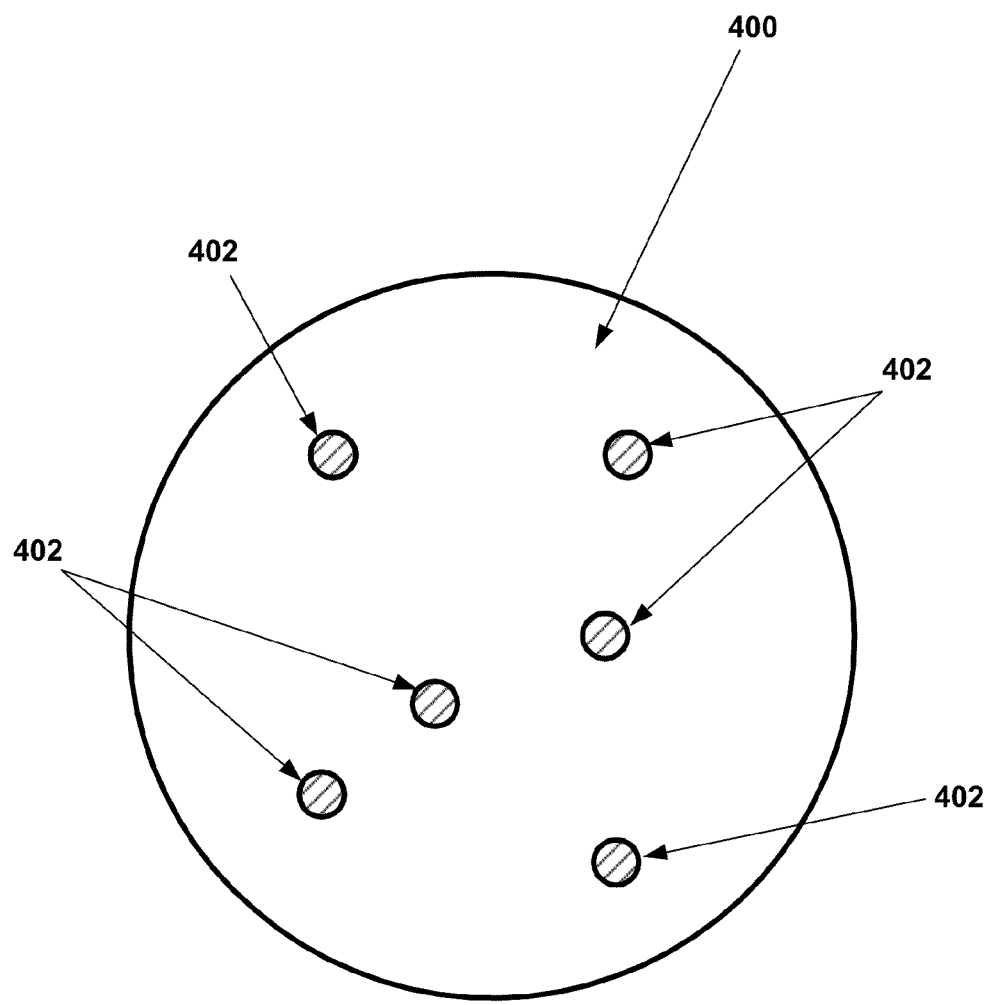
FIG. 4 is a conceptual diagram illustrating an LSDF and microprints for the exemplary receiver, in accordance with an embodiment of the present invention.

FIG. 4 is a conceptual diagram illustrating an LSDF 400 and microprints 402 for the exemplary receiver 102, in accordance with an embodiment of the present invention. In the example of FIG. 4, the LSDF 400 represents the data space of values based on jitter values received at a particular receiver 102 over a predefined period of time. Each microprint 402 represents a smaller amount of data based on jitter values collected over a much shorter period of time. For example, the LSDF 400 can represent data collected at receiver 102 over a twenty-four hour period of time, while each microprint 402 represents, for example, 45 seconds of data collected at receiver 102. The LSDF 400 for each receiver 102a-102d is stored in the LSDF database 114 connected to the authentication server 112. Broadly speaking, when embodiments of the present invention need to perform verification, a request is made for current microprint data 402 from a particular receiver. The current microprint data 402 then is compared to the LSDF 400 for the particular receiver. If the current microprint data 402 falls within the scope of the LSDF 400 for the particular receiver, authentication is successful, otherwise authentication fails.

Figure 5:
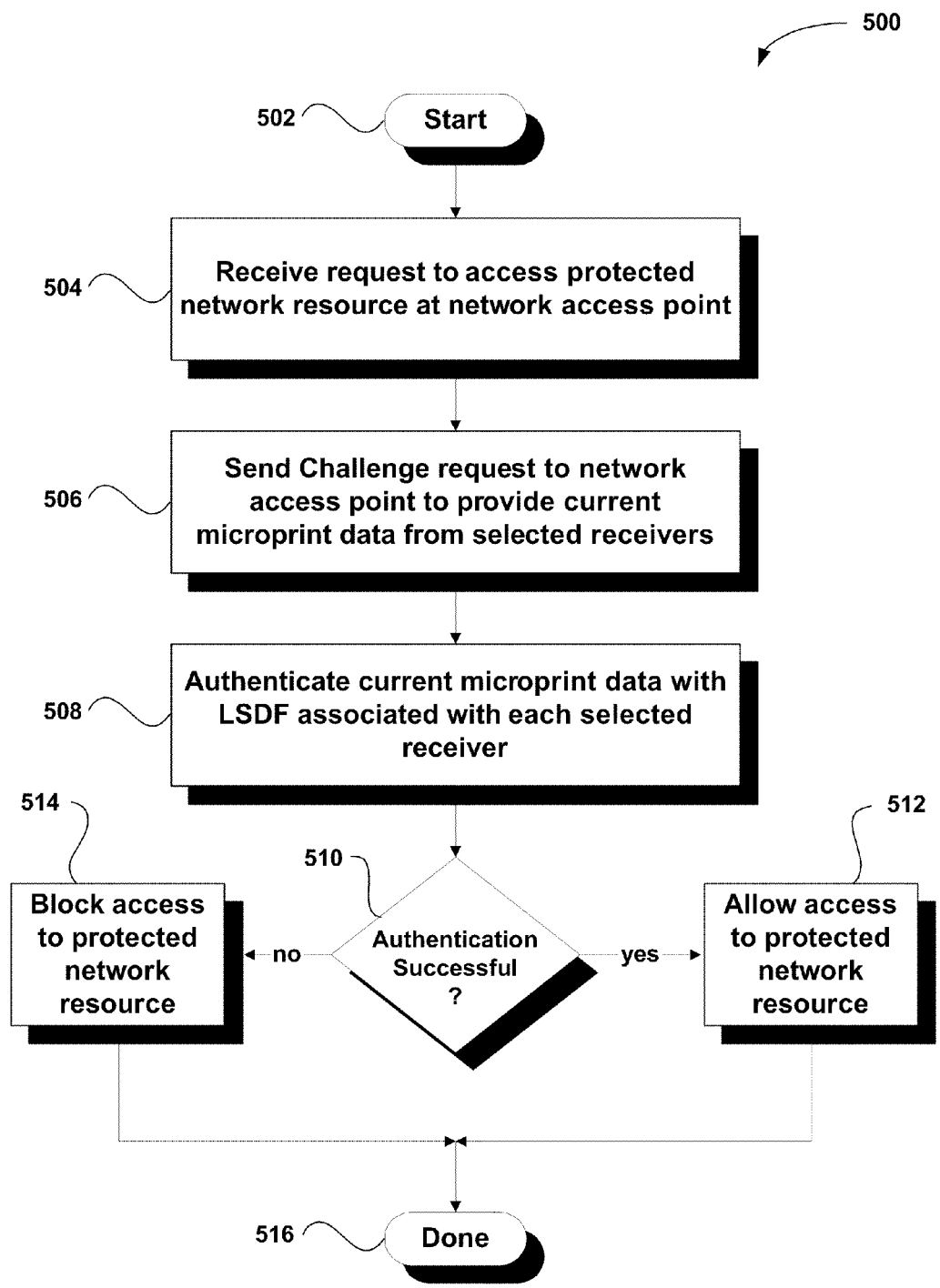
FIG. 5 is a flowchart showing a method for authenticating access to a protected network resource, in accordance with an embodiment of the present invention.

FIG. 5 is a flowchart showing a method 500 for authenticating access to a protected network resource, in accordance with an embodiment of the present invention. In an initial operation 502 preprocess operations are performed. Preprocess operations can include, for example, generating location specific digital fingerprints (LSDF) for each receiver in the security system, storing the LSDFs in an LSDF database, and further operations that will be apparent to those skilled in the art after a careful review of the present disclosure.

In operation 504, a request to access a protected resource is received at a network access point. Referring back to FIG. 1, when a user using the client computer 106 attempts to access the protected network asset 108, the client computer 106 sends a request to access the protected resource 108 to the network switch 104. In one embodiment, client computers 106 are required to be directly connected to the network access point, such as network switch 104 to be allowed to access the protected network resource, such as protected network asset 108.

That is, in this embodiment, the client computer 106 is not allowed to be in communication with the network access point via another network node, but is required to be directly connected to the network switch 104 as illustrated in FIG. 1. As will be described in greater detail subsequently, the network equipment to which client computers are connected, such as network switch 104, act on the client computer's 106 behalf during an authentication process to authenticate access to the protected resource. In this manner, special hardware is not required to be integrated into each client computer 106 accessing the network switch 104 in order for proper authentication to take place.

In operation 506, a challenge request is sent to the network access point to provide current microprint data for one or more receivers in communication with the network access point. As illustrated in FIG. 1, once the network switch 104 attempts to access the protected network asset 108, the firewall 110 recognizes that the request is to access a protected network resource and consults the authentication server 112 to authenticate the request. In response, the authentication server 112 sends a challenge request to the network access point, the network switch 104 in FIG. 1. The challenge request is a request to the network switch 104 to provide current microprint data from one or more receivers 102a-102d. The challenge request can ask for current microprint data from all the receivers 102a-102d or fewer receivers. In one embodiment, the authentication server 112 can ask for current microprint data from a random sampling of receivers that can change each time a challenge request is sent. For example, the authentication server 112 can ask for current microprint data from receiver 102a, 102c, and 102d.

In response, the network switch 104 gathers current microprint data from the selected receivers and provides the data to the authentication server 112. As mentioned above, each microprint 402 represents an amount of data based on jitter values collected over a relatively short period of time. For example, each microprint can represent, for example, 45 seconds of data collected at a particular receiver 102. The collected microprint data for each selected receiver is then utilized to authenticate the access request to the protected network resource.

The collected current microprint data then is authenticated with the LSDF for each selected receiver, in operation 508. Referring back to FIG. 4, each LSDF 400 represents the data space of values based on jitter values received at a particular receiver 102 over a predefined period of time. For example, the LSDF 400 can represent data collected at receiver 102 over a twenty-four hour period of time, while each microprint 402 represents, for example, 45 seconds of data collected at receiver 102. The LSDF 400 for each receiver 102a-102d is stored in the LSDF database 114 connected to the authentication server 112. Turning back to FIG. 5, the current microprint data for each receiver is compared to the LSDF for the particular receiver. If the current microprint data falls within the scope of the LSDF for the particular receiver, authentication is successful for that receiver. This process is repeated for each selected receiver. If authentication is successful for each receiver, the authentication for the challenge request is successful.

A decision is then made as to whether the authentication for the challenge request is successful, in operation 510. If the authentication for the challenge request is successful, the method 500 branches to operation 512 where access is allowed to the protected network resource. Otherwise, access to the protected network resource is blocked, in operation 514. The method 500 then completes and post process operations are performed in operation 516. Post process operations can include issuing a temporary authentication token to the network access point allowing access to the protected network resource for a predefined period of time, facilitating access to the protected network resource, and further post process operations that will be apparent to those skilled in the art after a careful reading of the present disclosure.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for providing security for a protected network resource, comprising:
   a network access apparatus in communication with a receiver, wherein the receiver receives signals from a remote source, and wherein the network access apparatus is capable of collecting current microprint data for the receiver, the current microprint data being a plurality of values based on data values received at the receiver over a predefined period of time; and
   an authentication computer in communication with the network access apparatus, the authentication computer having access to an Location Specific Digital Fingerprint (LSDF) for the receiver, wherein the LSDF is a plurality of values based on data values received at the receiver over a predefined period of time,
   wherein the network access apparatus provides current microprint data for the receiver to the authentication computer, and wherein the authentication computer compares the current microprint data to the LSDF for the receiver to authenticate an access request;
   wherein the network access apparatus is in communication with a plurality of receivers, each receiver having an associated LSDF accessible to the authentication server;
   wherein the network access apparatus provides current microprint data for a random sampling of selected receivers of the plurality of receivers to the authentication computer, and wherein the authentication computer compares the current microprint data for each selected receiver to the LSDF associated with each receiver to authenticate an access request.

2. A system as recited in claim 1, wherein the values are jitter values, each jitter value being based on a difference in arrival times of at least two timing signals from the same remote source.

3. A system as recited in claim 2, wherein the predefined period of time for the LSDF values is longer than the predefined period of time for the microprint data values.

4. A system as recited in claim 1, wherein the network access apparatus provides current microprint data for each receiver of the plurality of receivers to the authentication computer, and wherein the authentication computer compares the current microprint data for each receiver to the LSDF associated with each selected receiver to authenticate an access request.

5. A method for providing security for a protected network resource, comprising:
   sending a challenge request to a network access apparatus in communication with a receiver receiving signals from a remote source, the challenge request requesting current microprint data for the receiver, the current microprint data being a plurality &values based on data values received at the receiver over a predefined period of time;
   sending the current microprint data for the receiver to an authentication server via the network access apparatus, the authentication computer having access to an Location Specific Digital Fingerprint (LSDF) for the receiver, wherein the LSDF is a plurality &values based on data values received at the receiver over a predefined period of time; and
   comparing the current microprint data to the LSDF for the receiver to authenticate an access request;
   wherein the network access apparatus is in communication with a plurality of receivers, each receiver having an associated LSDF accessible to the authentication server;
   sending current microprint data for a random sampling of selected receivers of the plurality of receivers to the authentication computer, and wherein the authentication computer compares the current microprint data for each selected receiver to the LSDF associated with each selected receiver to authenticate an access request.

6. A method as recited in claim 5, wherein the values are jitter values, each jitter value being based on a difference in arrival times of at least two timing signals from the same remote source.

7. A method as recited in claim 6, wherein the predefined period of time for the LSDF values is longer than the predefined period of time for the microprint data values.

8. A method as recited in claim 5, further comprising sending current microprint data for each receiver of the plurality of receivers to the authentication computer, and wherein the authentication computer compares the current microprint data for each receiver to the LSDF associated with each receiver to authenticate an access request.

9. A system for providing security for a protected network resource, comprising:
   a protected network resource;
   a network access apparatus in communication with the protected network resource and a plurality of receivers, wherein each receiver receives signals from a remote source, and wherein the network access apparatus is capable of collecting current microprint data for each receiver, the current microprint data being a plurality &values based on data values received at the particular receiver over a predefined period of time; and
   an authentication computer in communication with the network access apparatus, the authentication computer having access to an Location Specific Digital Fingerprint (LSDF) associated with each receiver, wherein the LSDF is a plurality &values based on data values received at the particular receiver over a predefined period of time,
   wherein the network access apparatus provides current microprint data for each receiver to the authentication computer, and wherein the authentication computer compares the current microprint data to the LSDF associated with each receiver to authenticate an access request and provide access to the protected network resource;
   wherein the network access apparatus provides current microprint data for a random sampling of selected receivers of the plurality of receivers to the authentication computer, and wherein the authentication computer compares the current microprint data for each selected receiver to the LSDF associated with each selected receiver to authenticate an access request.

10. A system as recited in claim 9, wherein the values are jitter values, each jitter value being based on a difference in arrival times of at least two timing signals from the same remote source.

11. A system as recited in claim 10, wherein the predefined period of time for the LSDF values is longer than the predefined period of time for the microprint data values.

12. A system as recited in claim 9, wherein the network access apparatus provides current microprint data for each receiver of the plurality of receivers to the authentication computer, and wherein the authentication computer compares the current microprint data for each receiver to the LSDF associated with each receiver to authenticate an access request.

* * * * *